US012179587B2

(12) United States Patent
Kihara et al.

(10) Patent No.: US 12,179,587 B2
(45) Date of Patent: Dec. 31, 2024

(54) ACCELERATOR DEVICE

(71) Applicant: DENSO CORPORATION, Kariya (JP)

(72) Inventors: Noriyasu Kihara, Kariya (JP); Kiyoshi Kimura, Kariya (JP); Takehiro Saito, Kariya (JP); Yasuhiro Otaka, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/319,203

(22) Filed: May 17, 2023

(65) Prior Publication Data
US 2023/0286378 A1 Sep. 14, 2023

Related U.S. Application Data

(63) Continuation of application No. PCT/JP2021/040952, filed on Nov. 8, 2021.

(30) Foreign Application Priority Data

Nov. 19, 2020 (JP) ................. 2020-192456

(51) Int. Cl.
B60K 26/02 (2006.01)
G05G 5/05 (2006.01)
G05G 25/02 (2006.01)

(52) U.S. Cl.
CPC .............. B60K 26/02 (2013.01); G05G 5/05 (2013.01); G05G 25/02 (2013.01); G05G 2505/00 (2013.01)

(58) Field of Classification Search
CPC .......... B60K 26/02; G05G 5/05; G05G 25/02; G05G 2505/00
See application file for complete search history.

(56) References Cited

U.S. PATENT DOCUMENTS

| 1,495,062 | A | * | 5/1924 | Bailhe | B60K 26/02 74/513 |
| 11,364,881 | B2 | * | 6/2022 | Kim | B60T 7/06 |
| 2007/0151398 | A1 | * | 7/2007 | Kim | G05G 1/30 74/513 |
| 2007/0193401 | A1 | * | 8/2007 | Campbell | G05G 1/38 74/560 |
| 2023/0056651 | A1 | | 2/2023 | Kihara et al. | |

FOREIGN PATENT DOCUMENTS

CN 201511825 U 6/2010

OTHER PUBLICATIONS

U.S. Appl. No. 17/981,771, Kihara et al., JP 2020-127837, filed Nov. 7, 2022.

* cited by examiner

Primary Examiner — Thomas C Diaz
(74) Attorney, Agent, or Firm — Nixon & Vanderhye P.C.

(57) ABSTRACT

An accelerator device includes a case provided on a floor, a pad arranged outside the case to be stepped on by a driver, a pedal arranged in the case to be rotatable in an accelerator opening direction by a stepping force of the pad, an arm connecting the pad to the pedal, and a biasing member configured to bias the pedal in an accelerator closing direction. One end of the arm is press-fitted into a connecting portion of the pad in a press-fitting direction. At least one of the arm or the pad is provided with a play removing part that is configured to eliminate a play between the one end of the arm and the connecting portion in the press-fitting direction by contacting the one end of the arm and the connecting portion.

6 Claims, 7 Drawing Sheets

(12) United States Patent

ACCELERATOR DEVICE

CROSS REFERENCE TO RELATED APPLICATIONS

The present application is a continuation application of International Patent Application No. PCT/JP2021/040952 filed on Nov. 8, 2021, which designated the U.S. and claims the benefit of priority from Japanese Patent Application No. 2020-192456 filed on Nov. 19, 2020. The entire disclosures of all of the above applications are incorporated herein by reference.

TECHNICAL FIELD

The present disclosure relates to an accelerator device.

BACKGROUND

An accelerator device is provided on a floor near feet of a seated driver in a vehicle compartment.

SUMMARY

According to at least one embodiment, an accelerator device includes a case provided on a floor, a pad arranged outside the case to be stepped on by a driver, a pedal arranged in the case to be rotatable in an accelerator opening direction by a stepping force of the pad, an arm connecting the pad to the pedal, and a biasing member configured to bias the pedal in an accelerator closing direction.

One end of the arm is press-fitted into a connecting portion of the pad in a press-fitting direction. At least one of the arm or the pad is provided with a play removing part that is configured to eliminate a play between the one end of the arm and the connecting portion in the press-fitting direction by contacting the one end of the arm and the connecting portion.

BRIEF DESCRIPTION OF DRAWINGS

The above and other objectives, features and advantages of the present disclosure will become more apparent from the following detailed description with reference to the accompanying drawings. In the drawings.

DETAILED DESCRIPTION

Figure 1:
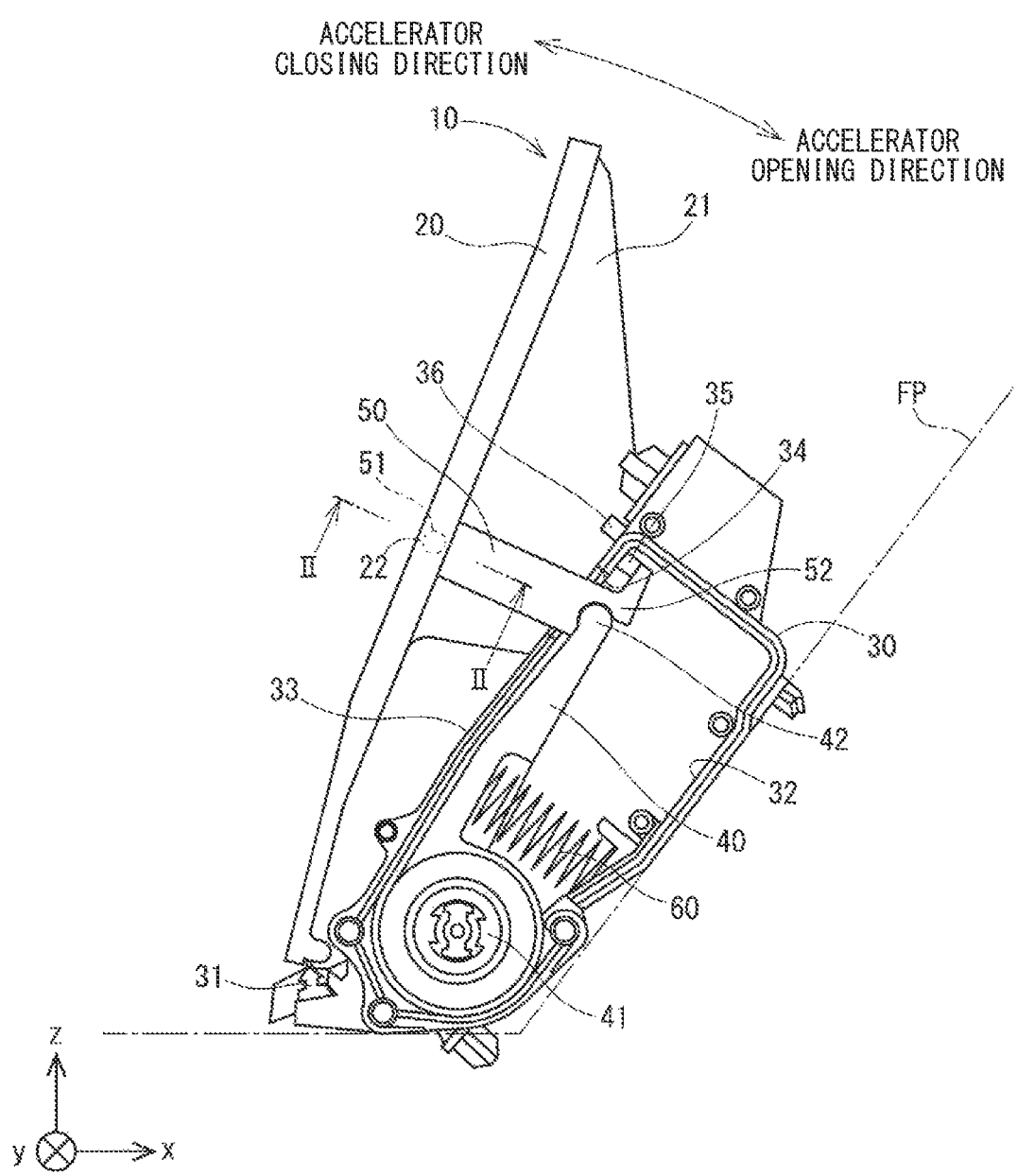
FIG. 1 is a side view of an accelerator device of a first embodiment.

To begin with, examples of relevant techniques will be described.

An accelerator device according to a comparative example is provided on a floor near feet of a seated driver in a vehicle compartment. In the accelerator device, an arm couples between a pedal inside a case and a pad outside the case, and the accelerator device detects an amount of depression of the pad by the driver.

In the comparative example, the pad and the arm are assembled by press-fitting a protrusion of the arm into a connecting portion of the pad. However, in terms of design, setting a clearance is necessary in the press-fitting direction between the protrusion and a retainer of the connecting portion. Due to this clearance, a play is formed between the protrusion and the connecting portion after the press-fitting. With this play between the protrusion and the connecting portion, when the driver switches between "depressing" and "returning" of the pad, a contact position between the protrusion and the connecting portion changes. Therefore, abnormal noise may be generated. In contrast to the comparative example, according to an accelerator device or the present disclosure, abnormal noise can be reduced.

According to one aspect of the present disclosure, an accelerator device includes a case provided on a floor, a pad arranged outside the case to be stepped on by a driver, a pedal arranged in the case to be rotatable in an accelerator opening direction by a stepping force of the pad, an arm connecting the pad to the pedal, and a biasing member configured to bias the pedal in an accelerator closing direction.

One end of the arm is press-fitted into a connecting portion of the pad in a press-fitting direction. At least one of the arm or the pad is provided with a play removing part that is configured to eliminate a play between the one end of the arm and the connecting portion in the press-fitting direction by contacting the one end of the arm and the connecting portion.

According to this, the connecting portion of the pad and the one end of the arm can be configured without the play. As a result, the noise generated by the play when the pad operation switches between "depressing" and "returning" is eliminated.

Hereinafter, embodiments will be described with reference to the drawings. In the embodiments, substantially the same components are denoted by the same reference numerals and description thereof is omitted.

First Embodiment

As shown in FIG. 1, an accelerator device 10 of a first embodiment is provided on a floor panel FP of a vehicle body. In FIG. 1, an x-axis indicates a traveling direction of the vehicle, a y-axis indicates a width direction of the vehicle, and a z-axis indicates a vertically upward direction. Hereinafter, unless otherwise specified, a shape or configuration of the accelerator device 10 installed on the vehicle body will be described. For example, the terms "upward" and "upper side" mean upward and upper side in the installed state in which the accelerator device 10 is installed on the vehicle body.

The accelerator device 10 includes a case 30 attached to the floor panel FP, a pad 20 that is stepped on by a driver, a pedal 40 that rotates in an accelerator opening direction by a force of stepping on the pad 20, and an arm 50 that couples between the pad 20 and the pedal 40, and a spring 60 as a biasing member that biases the pedal 40 in an accelerator closing direction. FIG. 1 shows a state in which a cover (not shown) provided on a front side of the drawing of the case 30 is removed.

The pad 20 is arranged outside the case 30 and is rotatably supported by a fulcrum portion 31 of the case 30 at a lower end of the pad 20. A protective wall 21 is provided on a side part of the pad 20 to close a gap between the pad 20 and the case 30 so that a foot of the driver is not caught in the gap.

The pedal 40 and the spring 60 are arranged inside the case 30. The pedal 40 is rotatably supported by a support shaft 41 substantially parallel to the y-axis. A spring 60 is provided between the pedal 40 and an inner wall 32 of the case 30. The case 30 has a partition wall 33 positioned between the pad 20 and the pedal 40. An opening 34 is provided at the partition wall 33. The arm 50 passes through the opening 34. A fully close stopper 35 and a fully open stopper 36 are provided at the partition wall 33. The fully close stopper 35 stops the arm 50 at a fully close position of an accelerator. The fully open stopper 36 stops the pad 20 at a fully open position on the accelerator.

The arm 50 has a shaft portion 51 provided at one end near the pad 20, and a hook portion 52 provided at the other end near the pedal 40. The shaft portion 51 is attached to a connecting portion 22 located in a middle area of the pad 20 in a longitudinal direction of the pad 20. The hook portion 52 of the arm 50 is hooked to a tip portion 42 of the pedal 40.

A structure in which the pad 20 is rotatably supported by the case 30 on the floor and the pad 20 is connected to the pedal 40 via the arm 50 is called as an "organ pedal structure" by person skilled in the art. The arm 50 comes into contact with the fully close stopper 35 when the pad 20 is not stepped on by the driver. Also, the pad 20 comes into contact with the fully open stopper 36 when the pad 20 is stepped on to the fully open position by the driver.

Figure 2:
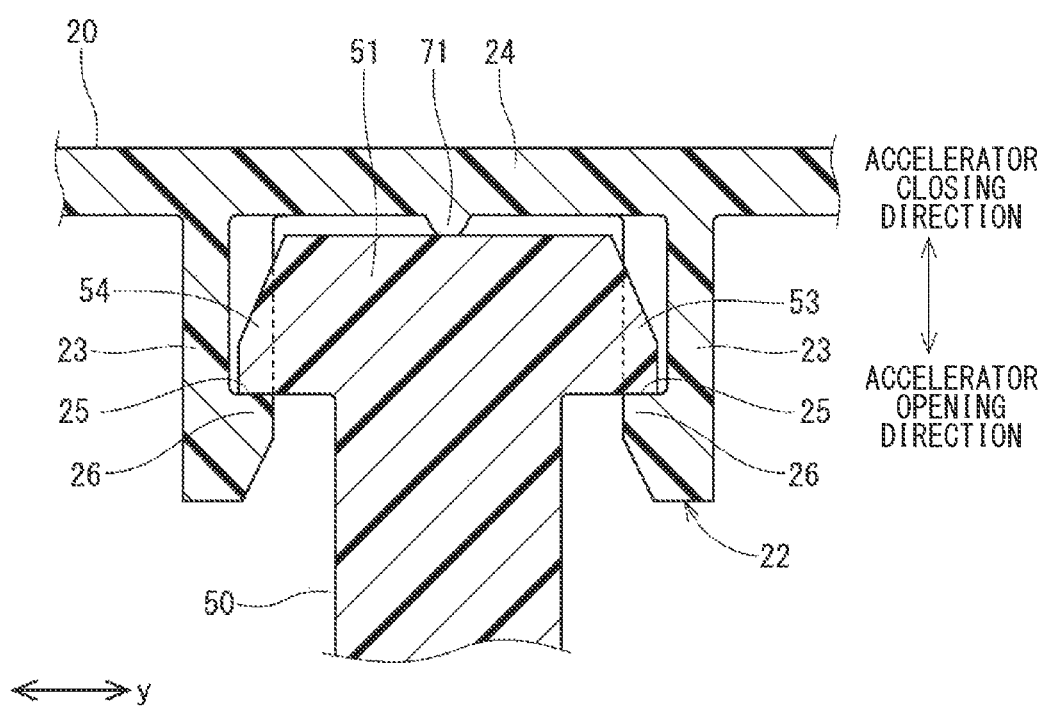
FIG. 2 is a cross-sectional view taken along a line II-II of FIG. 1.
Figure 3:
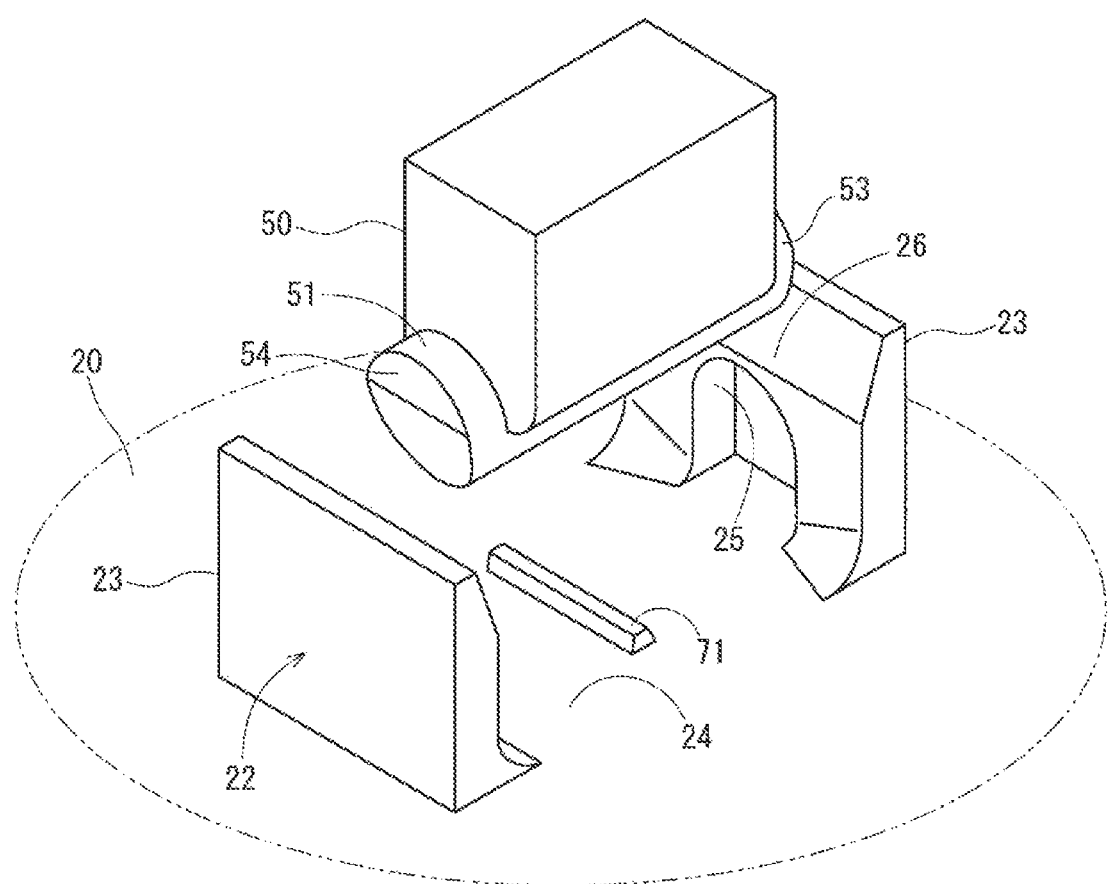
FIG. 3 is a perspective view showing a state in assembling a pad and an arm of FIG. 1.

The arm 50 and the shaft portion 51 are made of resin. As shown in FIGS. 2 and 3, the shaft portion 51 is integrally provided with the arm 50 and protrudes on both sides in a width direction (that is, the y-axis direction) of the pad 20. The pad 20 has a pair of support walls 23 that rotatably support the shaft portion 51. The pad 20 and the pair of support walls 23 are made of resin. The pair of support walls 23 protrude from a rear surface of the pad 20. The pair of support walls 23 are integrally formed on the rear surface of the pad 20 and faces each other. The shaft portion 51 is interposed between the pair of support walls 23 in the width direction of the pad 20. The pad 20 has a base portion 24 having a flat shape. The pair of support walls 23 protrude toward the case 30 from the base portion 24 that constitutes a stepping portion of the connecting portion 22.

A pair of bearing portions 25 are formed in the pair of support walls 23. The pair of bearing portions 25 are respectively recessed in central portions of the pair of support walls 23 in the width direction. One end portion 53 of the shaft portion 51 is fitted in one of the pair of bearing portions 25. The other end portion 54 of the shaft portion 51 is fitted in the other of the pair of bearing portions 25. The pair of support walls 23 have respectively retainers 26. A portion of the pair of support walls 23 closer to a distal end than the pair of bearing portions 25 is the retainers 26. The shaft portion 51 is press-fitted between the pair of support walls 23 of the connecting portion 22. The press-fitting direction of the shaft portion 51 is substantially the same as the accelerator opening/closing direction.

Figure 10:
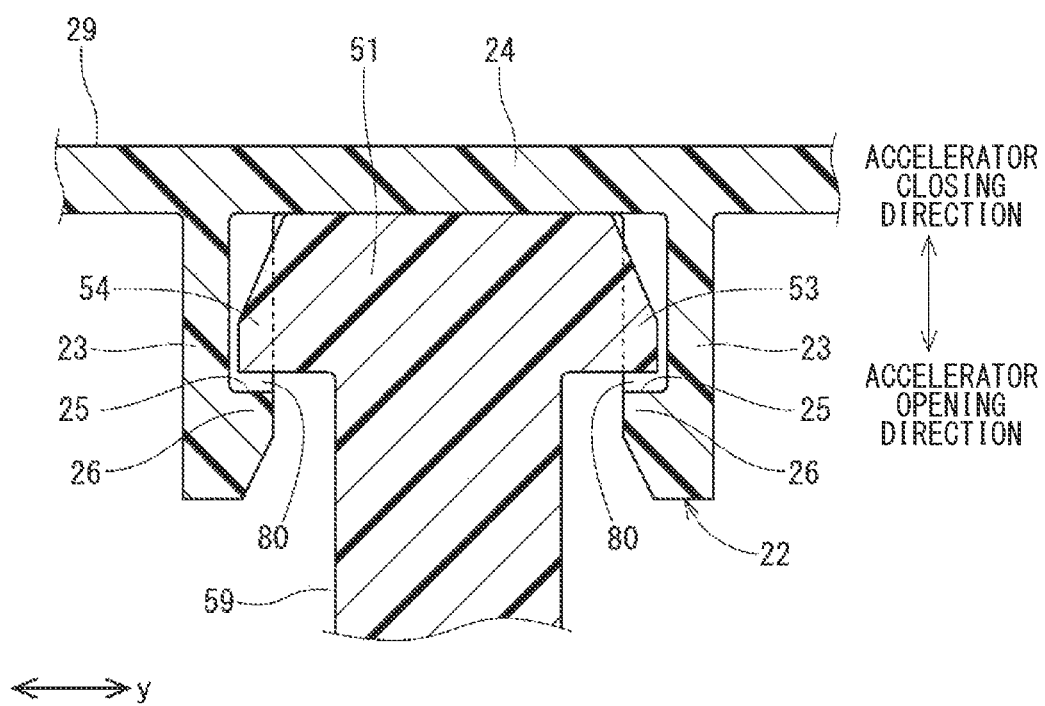
FIG. 10 is a cross-sectional view of a connecting portion between a pad and an arm of an accelerator device according to a comparative embodiment, and is a view corresponding to FIG. 2.

Here, a problem of the comparative embodiment shown in FIG. 10 will be described. In the comparative embodiment, a pad 29 and an arm 59 are assembled by press-fitting a shaft portion 51 into a connecting portion 22 and fitting it into a bearing portion 25. However, in order to ensure that the arm 59 and the pad 29 are securely assembled in consideration of dimensional tolerances, it is necessary to set a clearance 80 in the press-fitting direction between the shaft portion 51 and retainers 26 of a pair of support walls 23. Therefore, a play is generated between the shaft portion 51 and the connecting portion 22 after press-fitting by the clearance 80. With this play, when the driver switches between "depressing" and "returning" of the pad 20, a contact position between the shaft portion 51 and the connecting portion 22 changes between the retainers 26 and the base portion 24, that is, in the accelerator opening direction and the accelerator closing direction. Therefore, abnormal noise may be generated due to the play.

Contrary to this, in the first embodiment, the pad 20 has a protrusion 71 as a "play removing part" that removes the play in the press-fitting direction between the shaft portion 51 and the connecting portion 22 by bringing the shaft portion 51 and the connecting portion 22 into contact with each other. The protrusion 71 is hereinafter referred to as a play removing protrusion 71. The retainers 26 are positioned on one side of the shaft portion 51 in the press-fitting direction (that is, the accelerator opening direction), while the play removing protrusion 71 is positioned on the other side of the shaft portion 51 in the press-fitting direction (that is, the accelerator closing direction). The play removing protrusion 71 protrudes from the base portion 24 of the connecting portion 22 and contacts the shaft portion 51. As a result, a gap between the shaft portion 51 and the connecting portion 22 in the accelerator closing direction is eliminated. Furthermore, a gap between the shaft portion 51 and the connecting portion 22 in the accelerator opening direction is eliminated by pushing the shaft portion 51 to one side in the press-fitting direction toward the retainers 26. That is, the play removing protrusion 71 causes the shaft portion 51 to abut against the connecting portion 22 on both sides in the accelerator opening direction and the accelerator closing direction. In the first embodiment, the play removing protrusion 71 is provided at a single position in a middle area of the shaft portion 51 in an axial direction of the shaft portion 51.

Figure 4:
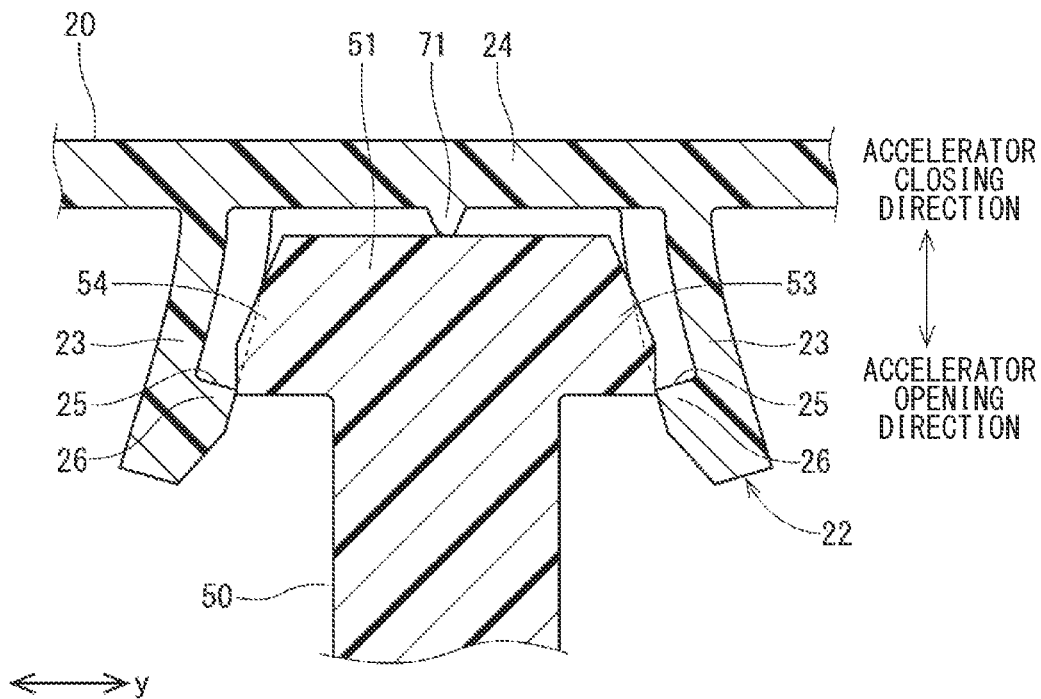
FIG. 4 is a cross-sectional view showing a state in assembling the pad and the arm, and is a view corresponding to FIG. 2.

As shown in FIG. 4, the pair of support walls 23 are pushed apart by the shaft portion 51 when the shaft portion 51 is press-fitted between the pair of the support walls 23, and are elastically deformed such that the pair of support walls 23 warps from a root portion to the tip portion. The play removing protrusion 71 is provided on the pad 20. Hardness of the pad 20 is lower than that of the arm 50. Therefore, as shown in FIG. 4, when the shaft portion 51 is pushed further from the position where the shaft portion 51 just contacts the play removing protrusion 71, the play removing protrusion 71 is plastically deformed. When an interference between the retainers 26 and the shaft portion 51 is released, the pair of support walls 23 are elastically restored, and the pair of bearing portions 25 are fitted to the end portions 53 and 54 of the shaft portion 51 as shown in FIG. 2. The play removing protrusion 71 is plastically deformed when the shaft portion 51 is press-fitted into the connecting portion 22, so that the play between the shaft portion 51 and the connecting portion 22 in the press-fitting direction is adjusted to just disappear.

As described above, in the first embodiment, the shaft portion 51 of the arm 50 is press-fitted into the connecting portion 22 of the pad 20. The pad 20 has the play removing part 71 that eliminates the play between the shaft portion 51 and the connecting portion 22 in the press-fitting direction by bringing the shaft portion 51 and the connecting portion 22 into contact with each other. According to this, the connecting portion 22 of the pad 20 and the shaft portion 51 of the arm 50 can be configured without the play. As a result, the noise generated by the play when the pad operation switches between "depressing" and "returning" is eliminated.

Further, in the first embodiment, the connecting portion 22 has the retainers 26 located on one end of the shaft portion 51 in the press-fitting direction. The play removing protrusion 71 protrudes from the connecting portion 22 toward the shaft portion 51 or from the shaft portion 51 toward the connecting portion 22 on the other end of the shaft portion 51 in the press-fitting direction. According to this, when the arm 50 is assembled to the pad 20, one end of the shaft portion 51 in the press-fitting direction comes into contact with the retainers 26. Since the other end of the shaft portion 51 in the press-fitting direction comes into contact with the play removing part 71, the play in the press-fitting direction does not occur.

Further, in the first embodiment, the play removing protrusion 71 is provided on the pad 20. The hardness of the pad 20 is lower than that of the arm 50. According to this, when the shaft portion 51 is press-fitted into the connecting portion 22, the play removing protrusion 71 can be positively plastically deformed.

Further, in the first embodiment, the play removing protrusion 71 is plastically deformed when the shaft portion 51 is press-fitted into the connecting portion 22, so that the play removing protrusion 71 absorbs the play between the shaft portion 51 and the connecting portion 22 in the press-fitting direction. According to this, the connecting portion 22 of the pad 20 and the shaft portion 51 of the arm 50 can be configured without the play.

Second Embodiment

Figure 5:
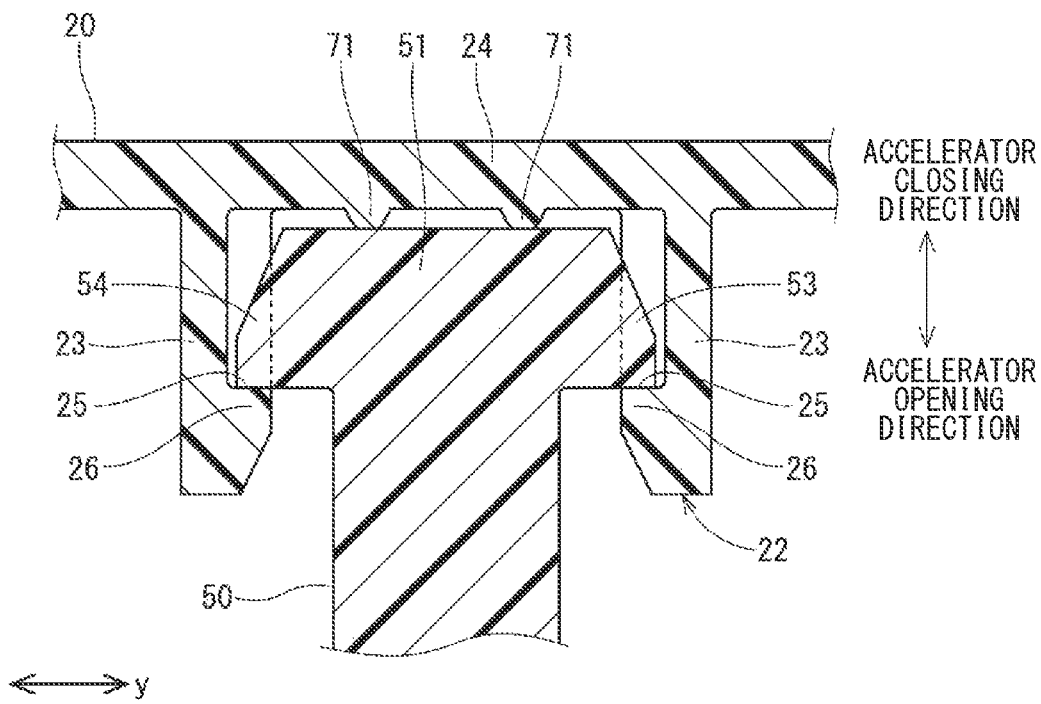
FIG. 5 is a cross-sectional view of a connecting portion between a pad and an arm of an accelerator device according to a second embodiment, and is a view corresponding to FIG. 2.

In a second embodiment, as shown in FIG. 5, two play removing protrusions 71 are provided at a pad 20 to be arranged in an axial direction of a shaft portion 51. In other embodiments, three or more play removing protrusions 71 may be provided. Thus, a number of play removing protrusions 71 can be changed according to, for example, adjustment of a press-fitting load of the shaft portion 51.

Third Embodiment

Figure 6:
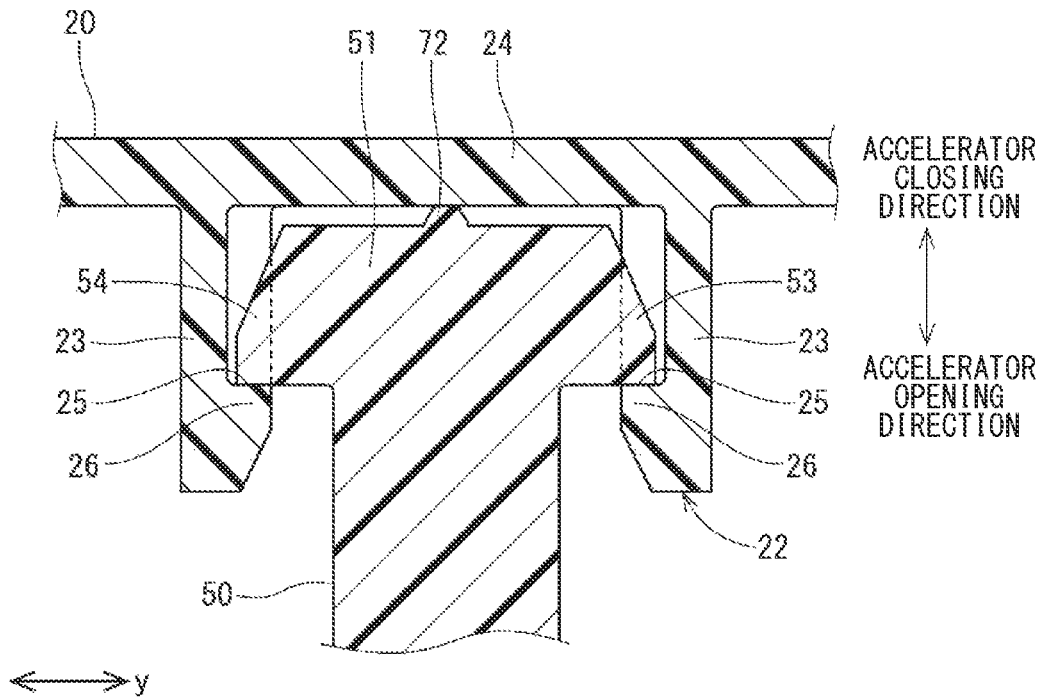
FIG. 6 is a cross-sectional view of a connecting portion between a pad and an arm of an accelerator device according to a third embodiment, and is a view corresponding to FIG. 2.

In a third embodiment, a play removing protrusion 72 is provided integrally with a shaft portion 51 as shown in FIG. 6. The play removing protrusion 72 protrudes from the shaft portion 51 toward a base portion 24 of a pad 20. In the third embodiment, a single play removing protrusion 72 is is provided at a middle area of the shaft portion 51 in an axial direction of the shaft portion 51. In this way, it is possible to change a formation target of the play removing protrusion 72 according to a material of an arm 50 and a pad 20, for example.

Fourth Embodiment

Figure 7:
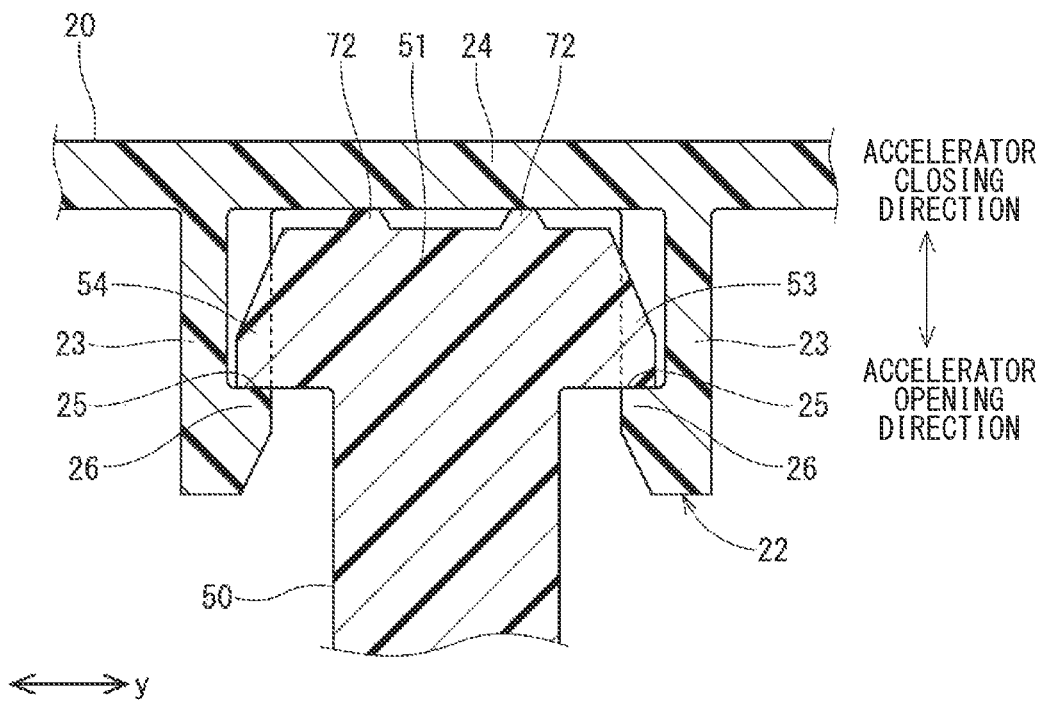
FIG. 7 is a cross-sectional view of a connecting portion between a pad and an arm of an accelerator device according to a fourth embodiment, and is a view corresponding to FIG. 2.

In a fourth embodiment, as shown in FIG. 7, two play removing protrusions 72 are provided at a shaft portion 51 to be arranged in an axial direction of the shaft portion 51. In other embodiments, three or more play removing protrusions 72 may be provided. Thus, a number of play removing protrusions 72 can be changed according to, for example, adjustment of a press-fitting load of the shaft portion 51.

Other Embodiments

Figure 8:
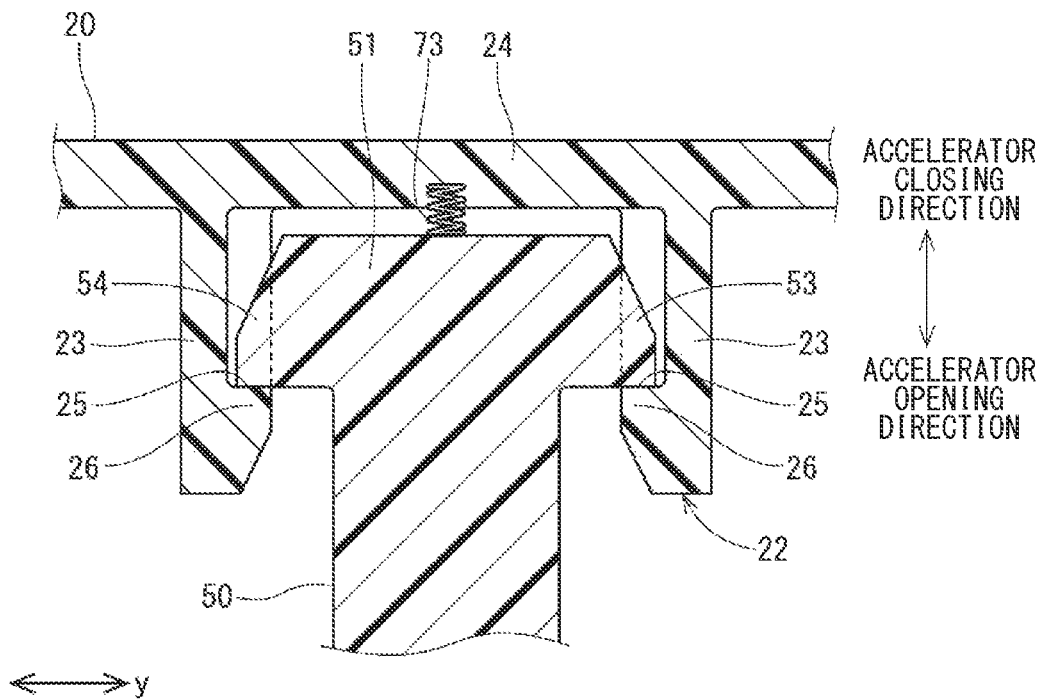
FIG. 8 is a cross-sectional view of a connecting portion between a pad and an arm of an accelerator device according to another embodiment, and is a view corresponding to FIG. 2.
Figure 9:
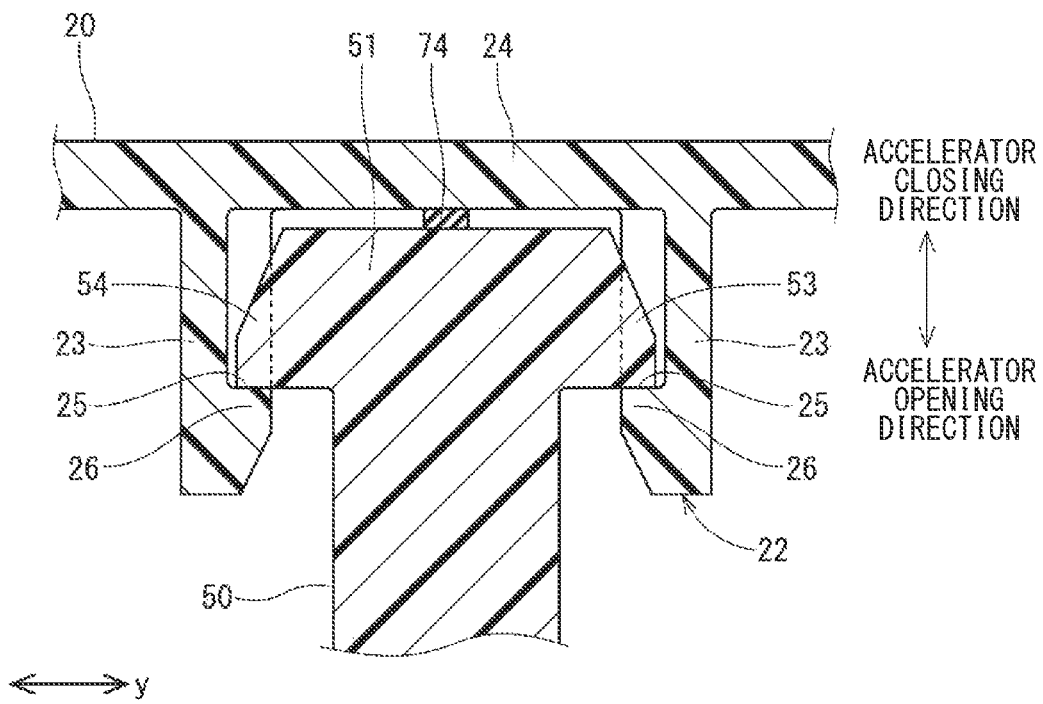
FIG. 9 is a cross-sectional view of a connecting portion between a pad and an arm of an accelerator device according to another embodiment, and is a view corresponding to FIG. 2.

In other embodiments, as shown in FIG. 8, a play removing part 73 may be a spring made of metal or resin fixed to a pad 20 or an arm 50. In FIG. 8, the play removing part 73 is inserted into the pad 20. In other embodiments, the play removing part 74 may be an elastic member such as rubber fixed to a pad 20 and an arm 50 as shown in FIG. 9. In FIG. 9, the play removing part 74 is glued to the pad 20. In this way, the play removing part 74 may be made of a separate member from the pad 20 and the arm 50, and may not be plastically deformed when a shaft portion 51 is press-fitted. In short, the play removing part 74 should function so as to bring the shaft portion 51 and the connecting portion 22 into contact with each other to eliminate the play between them in the press-fitting direction.

In other embodiments, a play removing part may be provided integrally with a pad or an arm and provided with a cavity or a notch so as to facilitate elastic deformation.

In other embodiments, play removing parts may be provided on both a pad and an arm.

The present disclosure is not limited to the embodiments described above, and various modifications are possible within the scope of the present disclosure without departing from the spirit of the invention.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An accelerator device comprising:
   a case provided on a floor;
   a pad arranged outside the case to be stepped on by a driver;
   a pedal arranged in the case to be rotatable in an accelerator opening direction by a stepping force of the pad;
   an arm connecting the pad to the pedal; and
   a biasing member configured to bias the pedal in an accelerator closing direction, wherein one end of the arm is press-fitted into a connecting portion of the pad in a press-fitting direction,
   at least one of the arm or the pad is provided with a play removing part that is configured to eliminate a play between the one end of the arm and the connecting portion in the press-fitting direction by contacting the one end of the arm and the connecting portion, the connecting portion has a retainer provided at a portion shifted from the one end of the arm in one direction in the press-fitting direction, and the play removing part is a protrusion protruding toward the one end of the arm from the connecting portion or toward the connecting portion from the one end of the arm in the other direction in the press-fitting direction.

2. The accelerator device according to claim 1, wherein the protrusion includes a plurality of protrusion parts separated from each other.

3. The accelerator device according to claim 1, wherein the protrusion is provided at one of the arm and the pad, and the arm or the pad with the protrusion has a lower hardness than the pad or the arm without the protrusion.

4. An accelerator device comprising:

a case provided on a floor:

a pad arranged outside the case to be stepped on by a driver:

a pedal arranged in the case to be rotatable in an accelerator opening direction by a stepping force of the pad;

an arm connecting the pad to the pedal, and a biasing member configured to bias the pedal in an accelerator closing direction, wherein one end of the arm is press-fitted into a connecting portion of the pad in a press-fitting direction, at least one of the arm of the pad is provided with a play removing part that is configured to eliminate a play between the one end of the arm and the connecting portion in the press-fitting direction by contacting the one end of the arm and the connecting portion, and the play removing part is configured to be plastically deformed and to absorb the play in the press-fitting direction between the one end of the arm and the connecting portion by plastically deforming when the one end of the arm is press-fitted into the connecting portion.

5. An accelerator device comprising:

a case provided on a floor;

a pad arranged outside the case to be stepped on by a driver;

a pedal arranged in the case to be rotatable in an accelerator opening direction by a stepping force of the pad;

an arm connecting the pad to the pedal; and a biasing member configured to bias the pedal in an accelerator closing direction, wherein one end of the arm is press-fitted into a connecting portion of the pad in a press-fitting direction, at least one of the arm or the pad is provided with a play removing part that is configured to eliminate a play between the one end of the arm and the connecting portion in the press-fitting direction by contacting the one end of the arm and the connecting portion, the connection portion includes a pair of support walls protruding from a base portion of the pad, and a pair of retainers respectively provided at tip ends of the pair of the support walls, and the one end of the arm is configured to contact the play removing part and the retainers and to be fixed between the play removing part and the retainers.

6. An accelerator device comprising:

a case;

a pad arranged outside the case to be stepped on by a driver;

a pedal arranged in the case to be rotatable in an accelerator opening direction by a stepping force of the pad;

an arm connecting the pad to the pedal; and a biasing member configured to bias the pedal in an accelerator closing direction, wherein one end of the arm is press-fitted into a connecting portion of the pad in a press-fitting direction, at least one of the one end of the arm or a base portion of the pad is provided with a protrusion protruding in the press-fitting direction, the connecting portion includes a pair of support walls protruding from the base portion of the pad, and a pair of retainers respectively provided at tip ends of the pair of the support walls, and the one end of the arm and the connecting portion are configured in contact with each other by the protrusion, while the one end of the arm is in contact with the pair of retainers of the connecting portion.

* * * * *